(12) United States Patent
Lakes (10) Patent No.: US 6,857,489 B2
(45) Date of Patent: Feb. 22, 2005

(54) CRAWLER CRANE HAVING IDENTICAL LEFT AND RIGHT CRAWLER ASSEMBLIES

(75) Inventor: Martin Lakes, Ann Arbor, MI (US)

(73) Assignee: Manitowoc Crane Companies, Inc., Sparks, NV (US)

( * ) Notice: Subject to any disclaimer, the term of this patent is extended or adjusted under 35 U.S.C. 154(b) by 0 days.

(21) Appl. No.: 09/753,912

(22) Filed: Jan. 3, 2001

(65) Prior Publication Data

US 2002/0007973 A1 Jan. 24, 2002

Related U.S. Application Data

(60) Provisional application No. 60/183,770, filed on Feb. 18, 2000.

(51) Int. Cl.$^7$ .............................................. B62D 55/00
(52) U.S. Cl. ....................................... 180/9.1; 180/305
(58) Field of Search .............................. 180/6.7, 9, 9.1, 180/9.21, 9.26, 9.48, 305, 308

(56) References Cited

U.S. PATENT DOCUMENTS

| | | | |
|---|---|---|---|
| 3,416,622 A | * 12/1968 | Helm et al. ................. | 180/9.48 |
| 3,757,881 A | * 9/1973 | Short et al. ................. | 180/9.1 |
| 3,797,598 A | 3/1974 | Wanner | |
| 3,869,061 A | 3/1975 | Wanner | |
| 3,872,939 A | * 3/1975 | Eckert ....................... | 180/9.62 |
| 4,000,784 A | * 1/1977 | Morrow, Sr. et al. ...... | 180/9.48 |
| 4,014,400 A | 3/1977 | Cline et al. | |
| 4,029,165 A | 6/1977 | Miller et al. | |
| 4,068,732 A | 1/1978 | Granryd | |
| 4,204,583 A | 5/1980 | Toyoura et al. | |
| 4,431,074 A | 2/1984 | Langerud | |
| 4,469,186 A | * 9/1984 | Goodwine .................. | 180/9.1 |
| 4,519,465 A | 5/1985 | Triplett | |
| 4,673,050 A | 6/1987 | Zschocke | |
| 4,683,969 A | 8/1987 | Littau | |
| 4,998,591 A | 3/1991 | Zaunberger | |
| 5,282,363 A | 2/1994 | Ogawa et al. | |
| 5,286,044 A | 2/1994 | Satzler et al. | |
| 5,740,875 A | 4/1998 | Wilson, Sr. et al. | |
| 5,823,279 A | * 10/1998 | Petzold ....................... | 180/9.1 |
| 6,158,535 A | * 12/2000 | Porubcansky et al. ....... | 180/9.1 |
| 6,318,484 B2 | * 11/2001 | Lykken et al. ............... | 180/9.1 |

FOREIGN PATENT DOCUMENTS

| | | |
|---|---|---|
| DE | 2143329 | 3/1973 |
| DE | 2539278 | 9/1977 |
| FR | 1.571.771 | 6/1969 |

* cited by examiner

Primary Examiner—Daniel G. DePumpo
(74) Attorney, Agent, or Firm—Brinks Hofer Gilson & Lione (57) ABSTRACT

A crawler crane having identical left and right crawler assemblies. The left and right crawler assemblies each comprise an identical crawler drive assembly to power the individual crawlers. Each crawler drive assembly comprises a hydraulic drive motor connected to the crawler. Both crawler drive assemblies utilize identical mounting configurations for connecting the hydraulic drive motor to the frame of the crawler.

26 Claims, 6 Drawing Sheets

CRAWLER CRANE HAVING IDENTICAL LEFT AND RIGHT CRAWLER ASSEMBLIES

This application claims the benefit of U.S. Provisional Application No. 60/183,770, entitled Crawler Crane Having Identical Left And Right Crawler Assemblies, filed Feb. 18, 2000.

BACKGROUND OF THE INVENTION

The present invention relates to construction equipment, such as cranes or bulldozers, that utilize continuous tracks or crawler assemblies for lateral movement of the vehicle. In particular, the present invention relates to a crawler crane or crawler vehicle having identical left and right crawler assemblies.

In a conventional crawler crane, each crawler is typically powered by a hydraulic motor mounted directly on the crawler. Each hydraulic motor is connected to a hydraulic pump located on either the lower or upper works of the crane by as many as four hydraulic hoses. The hydraulic motors are typically located on the interior surface of the crawler frames near the forward end of the crane. The crawler assemblies are therefore symmetric about the centerline on the crane lower works. Consequently, each crawler assembly has a unique design and requires individual components and mounting configurations. In other words, a conventional crawler crane has separate left-hand and right-hand crawler assemblies, each assembly having a unique design and configuration.

A more recent crawler crane design utilizes hydraulic drive motors that are mounted on the crane lower works. Each hydraulic drive motor is connected to a crawler by a mechanical drive shaft that may be disassembled to permit removal of the crawler from the lower works of the crane without disconnecting the hydraulic motors from the hydraulic pump. This more recent crawler crane design is also symmetric about the centerline of the crane and therefore also utilizes individually designed and manufactured left-hand and right-hand crawler assemblies.

Crawler assemblies are costly to design and manufacture. These costs are increased by the use of separate left-hand and right-hand crawler assemblies. In particular, each crawler assembly must be designed and manufactured separately. For example, each crawler assembly requires the fabrication of a unique crawler frame and track frame weldment, and a unique mounting arrangement for the crawler drive assemblies. Other components used in the crawler assemblies must likewise be individually designed and manufactured for each individual crawler assembly. Utilization of identical crawler assemblies will reduce the number of individually designed and fabricated components, thereby reducing the manufacturing cost of the crawler assemblies.

Non-identical crawler assemblies also increase the cost of servicing or repair of the crane. For example, the crane operator or manufacturer often maintains replacement or spare crawler assemblies in the event that one of the crawler assemblies fails or is damaged. With a conventional crane design, it is necessary to maintain separate left-hand and right-hand drive assemblies. Utilization of identical crawler assemblies eliminates the need to purchase and maintain two complete crawler assemblies or different sets of components.

BRIEF SUMMARY OF THE INVENTION

The present invention provides a crawler crane having identical left and right crawler assemblies. The left and right crawler assemblies each comprise an identical crawler powered by an identical crawler drive assembly. Each crawler drive assembly comprises a hydraulic drive motor connected to the crawler. Both crawler drive assemblies utilize identical mounting configurations for connecting the hydraulic drive motor to the frame of the crawler. The crawler drive assemblies are ordinarily located at opposite ends of the crane lower works. The crawler assemblies are interchangeable and may be mounted on either side of the crane.

In the preferred embodiment of the invention, the hydraulic drive motors are mounted on the car body of the crawler crane. A mechanical shaft connects each hydraulic motor to its respective crawler. The mechanical drive shaft is removable so as to permit each crawler to be disassembled and removed from the crane without disconnecting the hydraulic drive motor from the hydraulic pump. In an alternative embodiment of the invention, the hydraulic drive motors are mounted directly on the crawler frame or track frame weldment.

The preferred embodiment of the invention includes features in addition to those listed above. Moreover, the advantages over the current art discussed above are directly applicable to the preferred embodiment, but are not exclusive. The other features and advantages of the present invention will be further understood and appreciated when considered in relation to the detailed description of the preferred embodiment.

DETAILED DESCRIPTION OF THE INVENTION

Although the present invention will find application in all types of crawler vehicles, the preferred embodiment of the invention is described in conjunction with the boom hoist cylinder crawler crane 10 of FIGS. 1—6. It should be understood, however, that the present invention can be incorporated in a conventionally rigged crawler crane. It should also be understood that the present invention can be incorporated in other types of crawler vehicles such as bulldozers.

Figure 1:
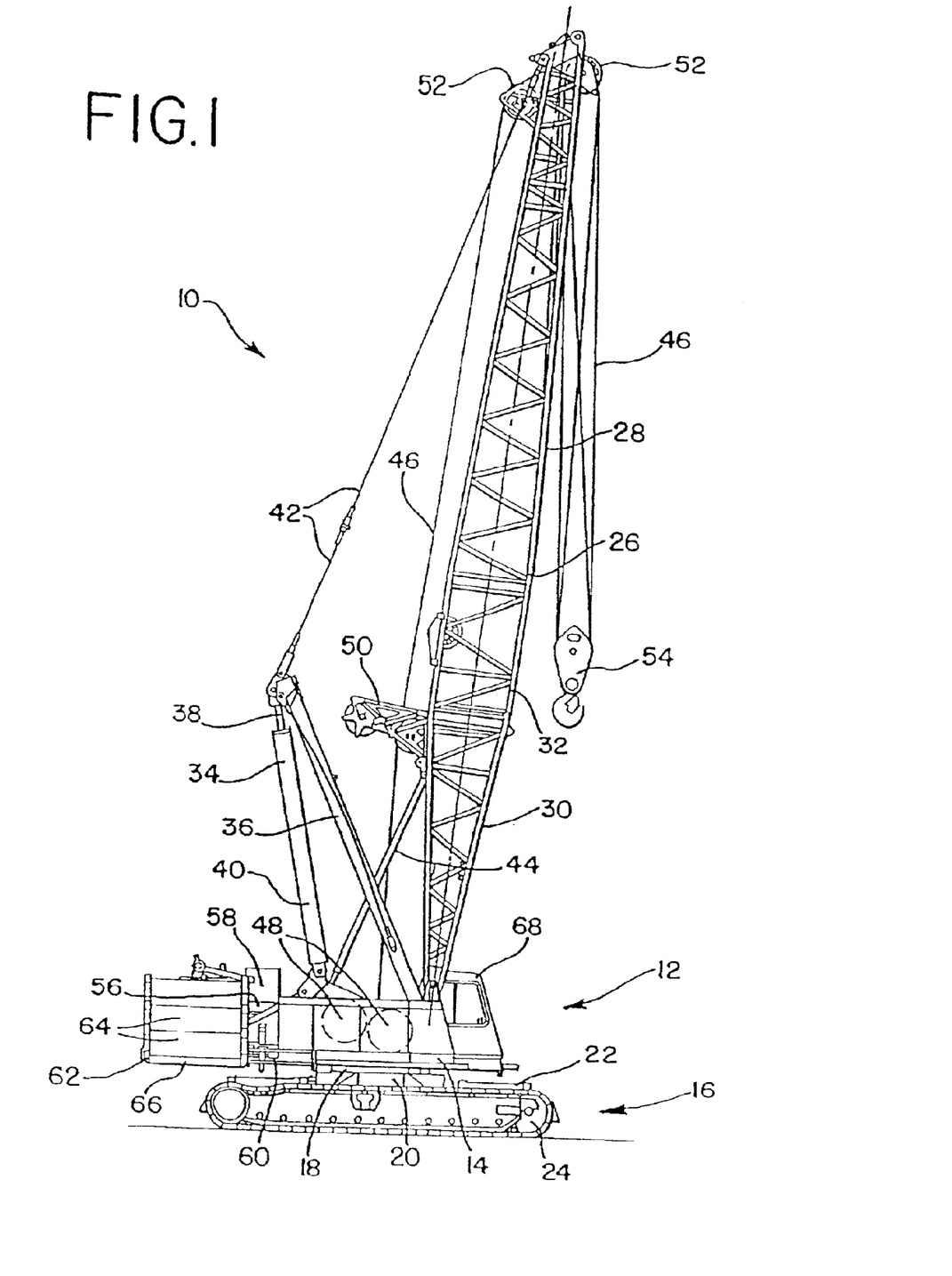
FIG. 1 is a right side elevational view of a complete crawler crane incorporating identical left and right crawler assemblies made in accordance with the teachings of this invention.

The boom hoist cylinder crawler crane 10 includes an upper works 12 having a rotating bed 14 that is rotatably connected to a lower works 16 by a swing bearing 18. The lower works 16 includes a car body 20, car body counterweights 22, and two independently powered crawlers 24, 25. In accordance with the teachings of this invention, crawlers 24 and 25 are identical in design. In other words, crawlers 24 and 25 are interchangeable and may be mounted on either side of the crane 10.

The upper works includes a boom 26 pivotally connected to the upper works 12. The boom 26 comprises a boom top 28 and a tapered boom butt 30. The boom 26 may also include one or more boom inserts 32 connected between the boom top 28 and the boom butt 30 to increase the overall length of the boom 26. The angle of the boom 26 is controlled by a pair of hydraulic boom hoist cylinders 34 pivotally connected to the upper works 12. A mast 36 is pivotally connected between the piston rods 38 of the hydraulic boom hoist cylinders 34 and the upper works 12. The boom hoist cylinders 34 are connected to the upper works 12 at a point preferably near the lower end of the boom hoist cylinders 34, but may be connected to the upper works 12 at any point along the bore 40 of the boom hoist cylinders 34. The boom 26 is connected to the piston rods 38 of the hydraulic boom hoist cylinders 34 and the mast 36 by one or more boom pendants 42. The boom pendants 42 may be connected to either the mast 36 or the piston rods 38 of the hydraulic boom hoist cylinders 34, but preferably are connected at a point near the connection between the mast 36 and the piston rods 38 of the hydraulic boom hoist cylinders 34. A boom backstop 44 is provided to prevent the boom 26 from exceeding a safe operating angle.

The position of the boom 26 is controlled by the hydraulic boom hoist cylinders 34. The mast 36 supports the connection between the hydraulic boom hoist cylinders 34 and the boom pendants 42 at a location that is distanced from the axis of the boom 26 to optimize the forces in the boom pendants 42 and the hydraulic boom hoist cylinders 34. This arrangement also permits the hydraulic boom hoist cylinders 34 to impart a force having a component that is perpendicular to the axis of the boom 26. This force is transferred to the end of the boom 26 by the boom pendants 42.

Extending the hydraulic boom hoist cylinders 34 decreases the angle between the front of the boom 26 and the ground. Conversely, retracting the hydraulic boom hoist cylinders 34 increases the angle between the front of the boom 26 and the ground. Under normal operating conditions, the hydraulic boom hoist cylinders 34 and the boom pendants 42 are in tension from the weight of the boom 26 and any load being lifted by the crane 10. Conversely, the mast 36 is in compression under normal operating conditions.

As best seen in FIG. 1, the upper works 12 further includes one or more load hoist lines 46 for lifting loads. Each load hoist line 46 is reeved around a load hoist line drum 48 supported on the rotating bed 14 of the upper works 12. The load hoist line drums 48 are rotated to either pay out or retrieve the load hoist lines 46. The load hoist lines 46 pass through a wire rope guide 50 attached to the upper interior side of the boom butt 30 and are reeved around a plurality of boom top sheaves 52 located at the upper end of the boom top 28. The wire rope guide 50 prevents the load hoist lines 46 from interfering with the lattice structure of the boom 26. A hook block 54 is typically attached to each load hoist line 46.

Figure 2:
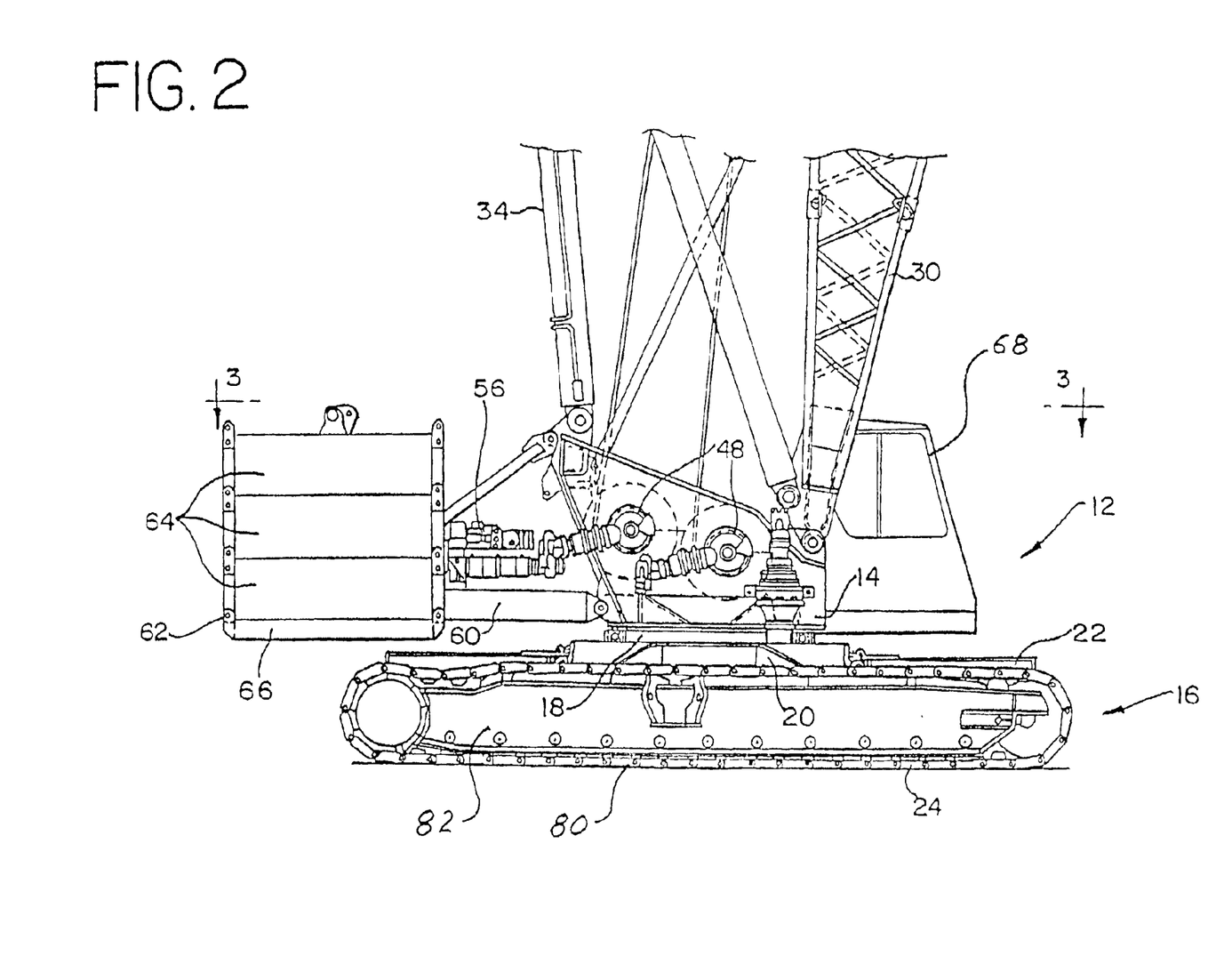
FIG. 2 is a partial right side elevational view of the crawler crane showing some of the internal components of the crane upper works.
Figure 3:
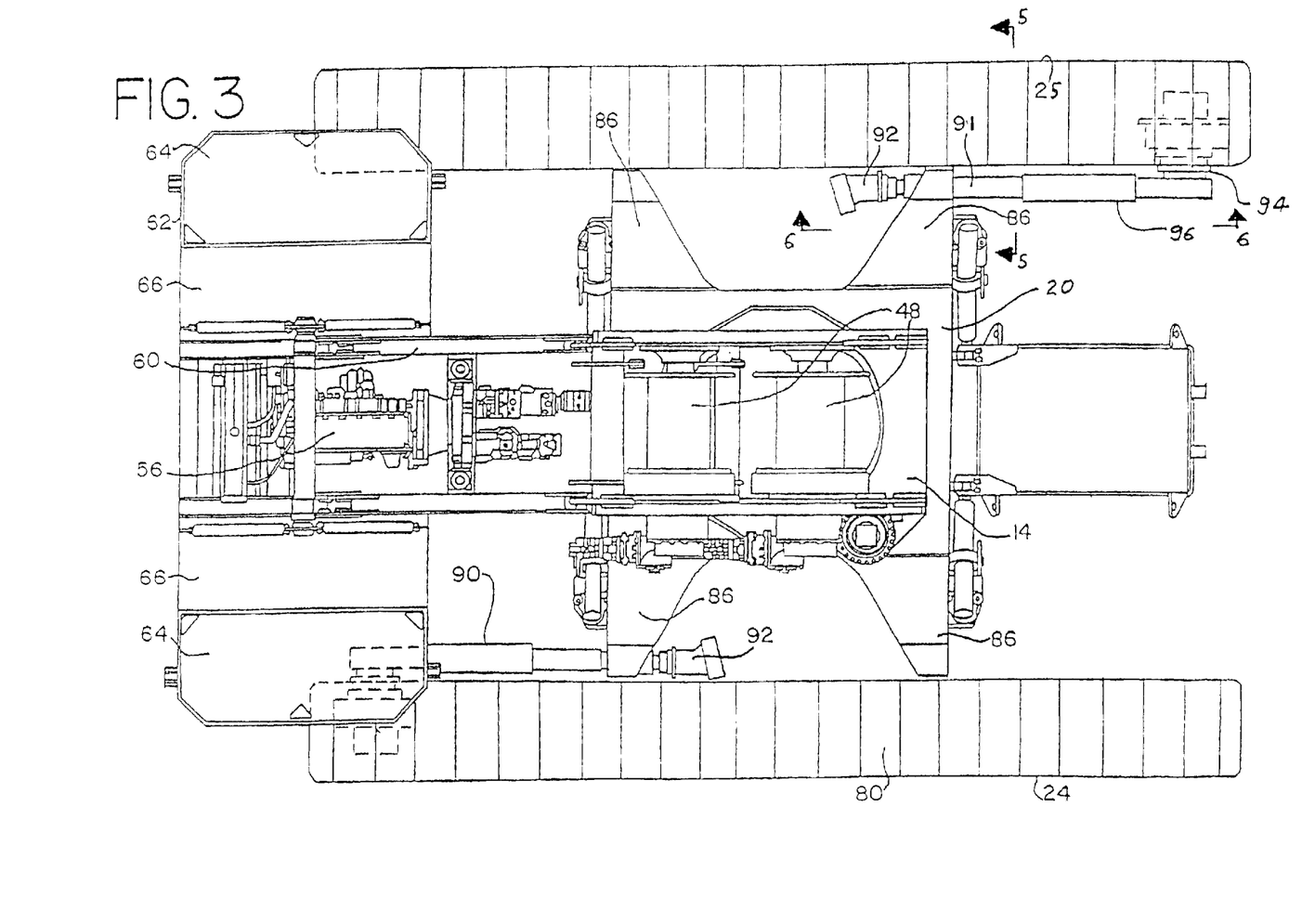
FIG. 3 is a sectional plan view of the crawler crane taken along line 3—3 of FIG. 2 showing details of the identical left and right crawler assemblies made in accordance with the teachings of this invention.

As best seen in FIGS. 2 and 3, the upper works 12 further includes a power plant 56 enclosed by a power plant housing 58 (see FIG. 1) and supported on a power plant base 60. The power plant base 60 is connected to the rear of the rotating bed 14. Connected to the power plant base 60 is a upper counter weight assembly 62 comprising a plurality of counter weights 64 supported on a counter weight tray 66. The power plant 56 supplies power for the various mechanical and hydraulic operations of the crane 10, including movement of the crawlers 24, 25, rotation of the rotating bed 14, rotation of the load hoist line drums 48, and operation of the hydraulic boom hoist cylinders 34. The mechanical and hydraulic connections between the power plant 56 and the above-listed components have been deleted from FIGS. 1–3 for clarity. Operation of the various functions of the crane 10 is controlled from the operator's cab 68.

Figure 4:
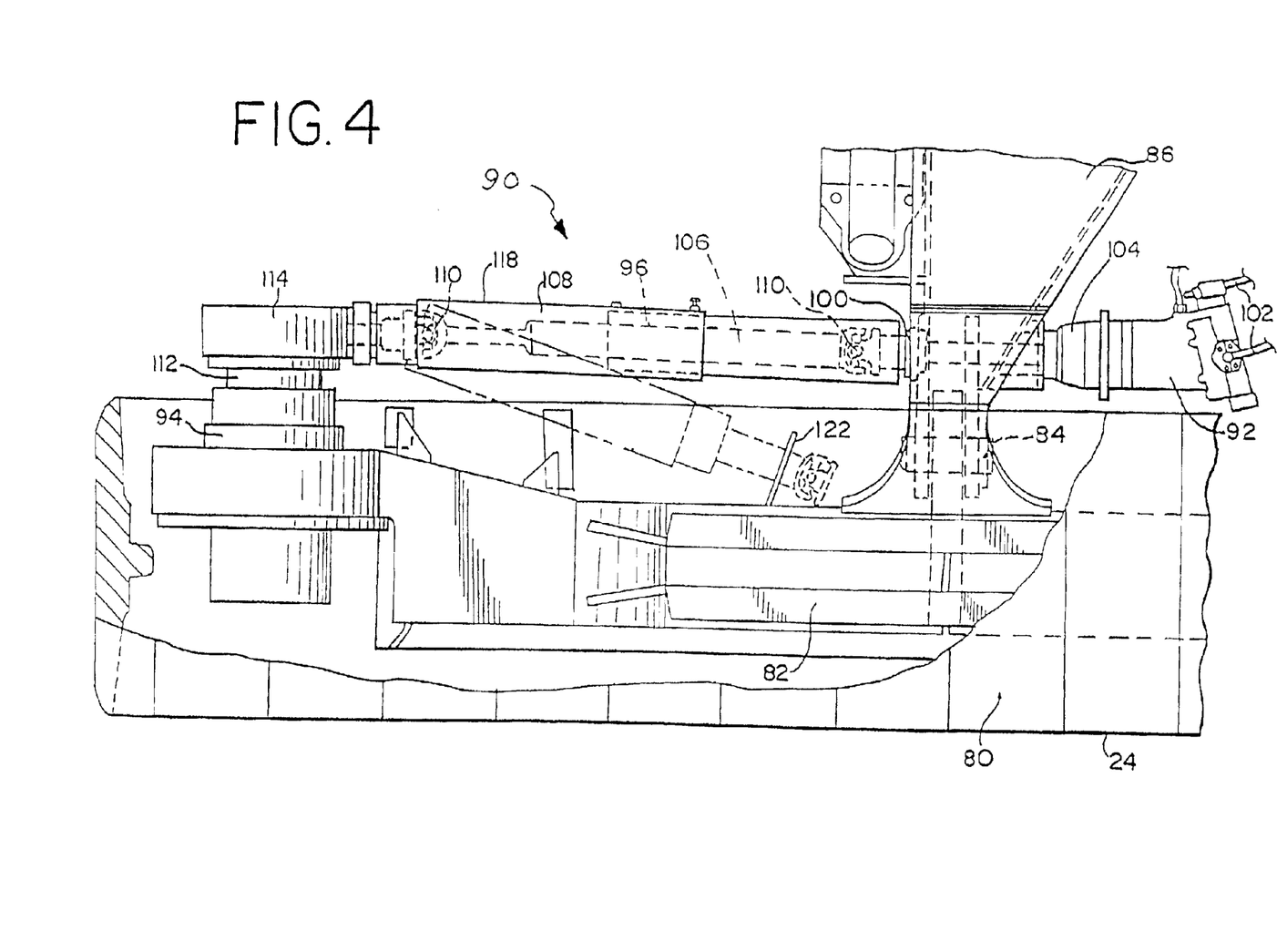
FIG. 4 is a partial plan view of a single crawler drive assembly.
Figures 5, 6:
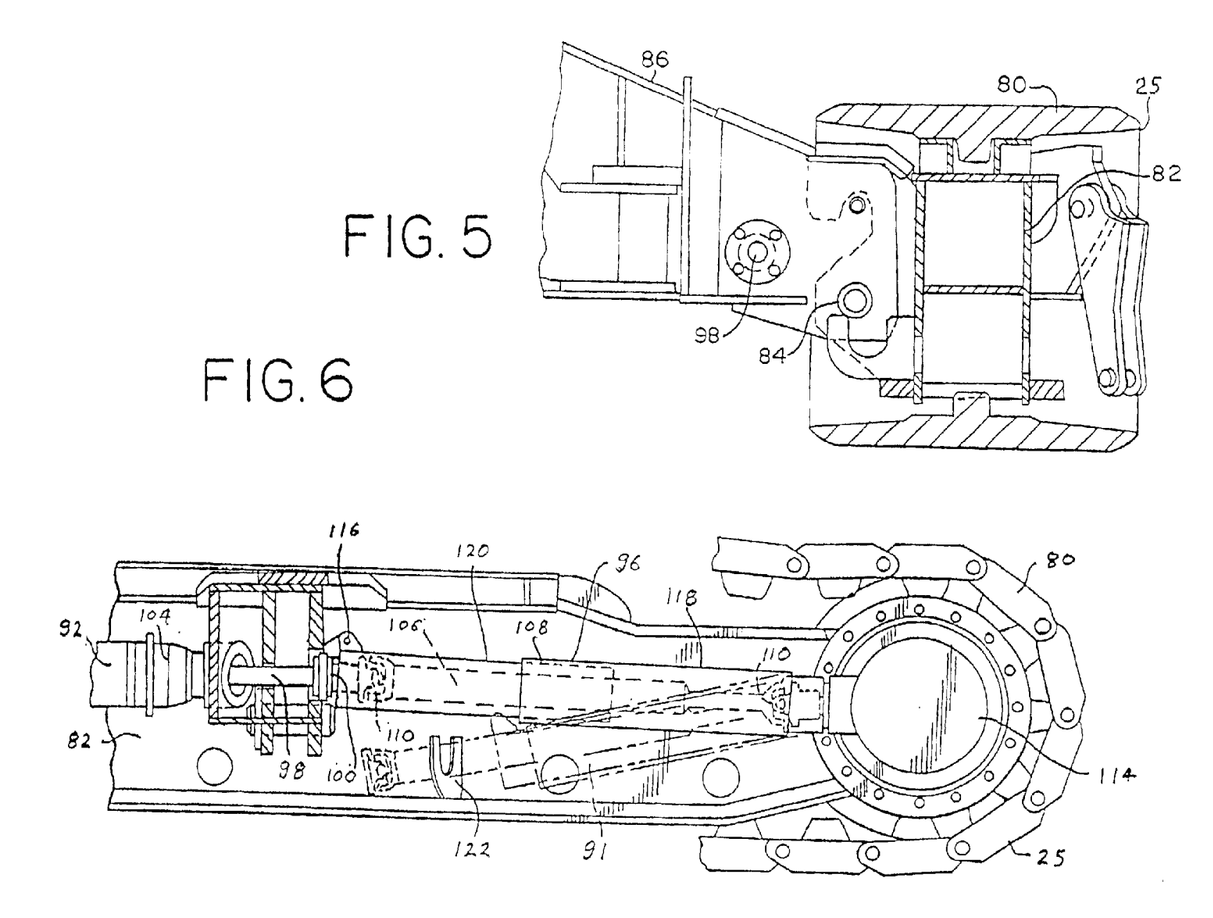
FIG. 5 is a sectional elevation view taken along line 5—5 of FIG. 3.
FIG. 6 is a sectional elevation view taken along line 6—6 of FIG. 3.

As best seen in FIGS. 3–5, each crawler 24, 25 is comprised of a crawler track 80 supported on a crawler frame 82. In the preferred embodiment, the crawler frame 82 comprises a track frame weldment. The crawler frame 82 for each crawler 24, 25 is identical in design and configuration. The crawlers 24, 25 are connected to the lower works 16 by removable crawler locking pins 84 connected between the crawler frame 82 and the wings 86 of the car body 20.

Each crawler 24, 25 is independently powered by a crawler drive assembly 90, 91. The crawler drive assemblies 90, 91 are identical in design and configuration. As best seen in FIG. 3, each crawler drive assembly 90, 91 is located at an opposite end of the crane 10. In the preferred embodiment shown, the left crawler drive assembly 91 is located near the forward end of the crane 10 and the right crawler drive assembly 90 is located near the rearward end of the crane 10. It should be appreciated that the orientation of the crawler drive assemblies 90, 91 with respect to the crawlers 24, 25 is identical. In other words, the mounting configuration for the left crawler drive assembly 91 is the same as the mounting configuration for the right crawler drive assembly 90. It should also be appreciated that the individual weldments and components that comprise the crawler drive assemblies 90, 91 are functionally identical and include identical components. This eliminates the need to design and manufacture different weldments or components for each crawler 24, 25.

Because the crawler drive assemblies 90, 91 are functionally identical and include identical components, it is only necessary to describe either crawler drive assembly 90, 91. Thus it will be appreciated that while FIG. 4 is directed to the right crawler 24 and crawler drive assembly 90, and FIGS. 5–6 are directed to the left crawler 25 and crawler drive assembly 91, the individual components of the crawlers 24, 25 and crawler drive assemblies 90, 91 are the same.

In the preferred embodiment, the crawler drive assemblies 90, 91 each comprise a hydraulic drive motor 92 mounted on the car body 20, a track drive gear box assembly 94 mounted on the crawler 24, 25, and a mechanical drive shaft assembly 96 connected between the hydraulic drive motor 92 and the track drive gear box assembly 94. Power in the form of rotational torque is transferred by the mechanical drive shaft assembly 96 from the hydraulic drive motor 92 to the track drive gear box assembly 94 where it is utilized to move the crawler track 80.

As best seen in FIGS. 4–6, the hydraulic drive motor 92 is flange mounted on the interior vertical face of the car body wing 86. A coupling shaft 98 connected to the hydraulic drive motor 92 extends through to the opposite vertical face of the car body wing 86 and terminates in a removable connection 100. Alternatively, the drive shaft of the hydraulic drive motor 92 can be extended through the car body wing 86 and connected to the removable connection 100.

The hydraulic drive motor 92 is powered by a plurality of hydraulic hoses 102 connected to the power plant 56. The hydraulic drive motor 92 may also comprise a brake 104 to inhibit or prevent the rotation of the hydraulic drive motor 92.

As best seen in FIGS. 4 and 6, the mechanical drive shaft assembly 96 comprises a drive shaft 106 shielded by a collapsible shroud assembly 108. One end of the drive shaft 106 is connected to the removable connection 100 through a universal joint 110. The other end of the drive shaft 106 is connected to the track drive gear box assembly 94 on the crawler 24, 25. The connection of the drive shaft 106 to the track drive gear box assembly 94 also comprises a universal joint 110. The universal joints 110 are also shielded by the shroud assembly 108. The shroud assembly 108 protects any personnel who may be working near the crane 10 from the rotational movement of the drive shaft 106 and the universal joints 110, as well as preventing dirt and other contaminants from infiltrating these components.

As best seen in FIG. 4, the track drive gear box assembly 94 is mounted on the interior face the crawler frame 82 near one end of the crawler 24, 25 and comprises a planetary or speed reduction gear set 112 connected to the crawler track 80. The speed reduction gear set 112 increases the torque applied to the crawler track 80 through a reduction in the speed of angular rotation of the hydraulic drive motor 92. The track drive gear box assembly 94 further comprises a right-angle gear set 114 connected between the speed reduction gear set 112 and the mechanical drive shaft 106. The right-angle gear set 114 changes the direction of the axis of rotation of the drive shaft 106 by 90 degrees.

To disassemble the boom hoist cylinder crawler crane 10 for transport to a different job site, the crawlers 24, 25 are disconnected and removed from the lower works 16. Disconnection and removal of the crawlers 24, 25 necessitates the disassembly of the crawler drive assemblies 90, 91.

As best seen in FIGS. 4–6, the crawler drive assemblies 90, 91 are each disassembled by first removing the retaining pin 116 on the shroud assembly 108. Removal of the retaining pin 116 permits the shroud assembly 108 to collapse to permit access to the removable connection 100. In the preferred embodiment shown, the shroud assembly 108 comprises a pair of telescoping tubular members 118 and 120 wherein the tube 120 shielding the removable connection 100 can be retracted into the other tube 118 to expose the removable connection 100. The drive shaft 106 is then disconnected from the hydraulic drive motor 92 by disconnecting the removable connection 100. The mechanical drive shaft assembly 96 is then stowed on the crawler 24, 25 by placing the end of the drive shaft 106 on a storage bracket 122 attached to the interior side of the crawler frame 82. The stowed position of the mechanical drive shaft assembly 96 is shown in dashed lines in FIGS. 4 and 6.

As best seen in FIG. 5, the crawlers 24, 25 are then each disconnected from the car body 20 by removing crawler locking pins 84. The crawlers 24, 25 can then be removed and loaded onto a trailer (not shown) for transport to another job site. The hydraulic drive motor 92 stays mounted on the car body 20 during transport to the next job. As a result, the hydraulic drive motor 92 can remain connected to the hydraulic hoses 102, and consequently remain connected to the power plant 56.

Because the crawlers 24, 25 are functionally identical and include identical weldments and components, either crawler 24, 25 may be mounted on either side of the crane 10. This facilitates re-assembly of the crane 10 by eliminating the need to sequence the assembly of the crawlers 24, 25 to the car body 20.

Figure 7:
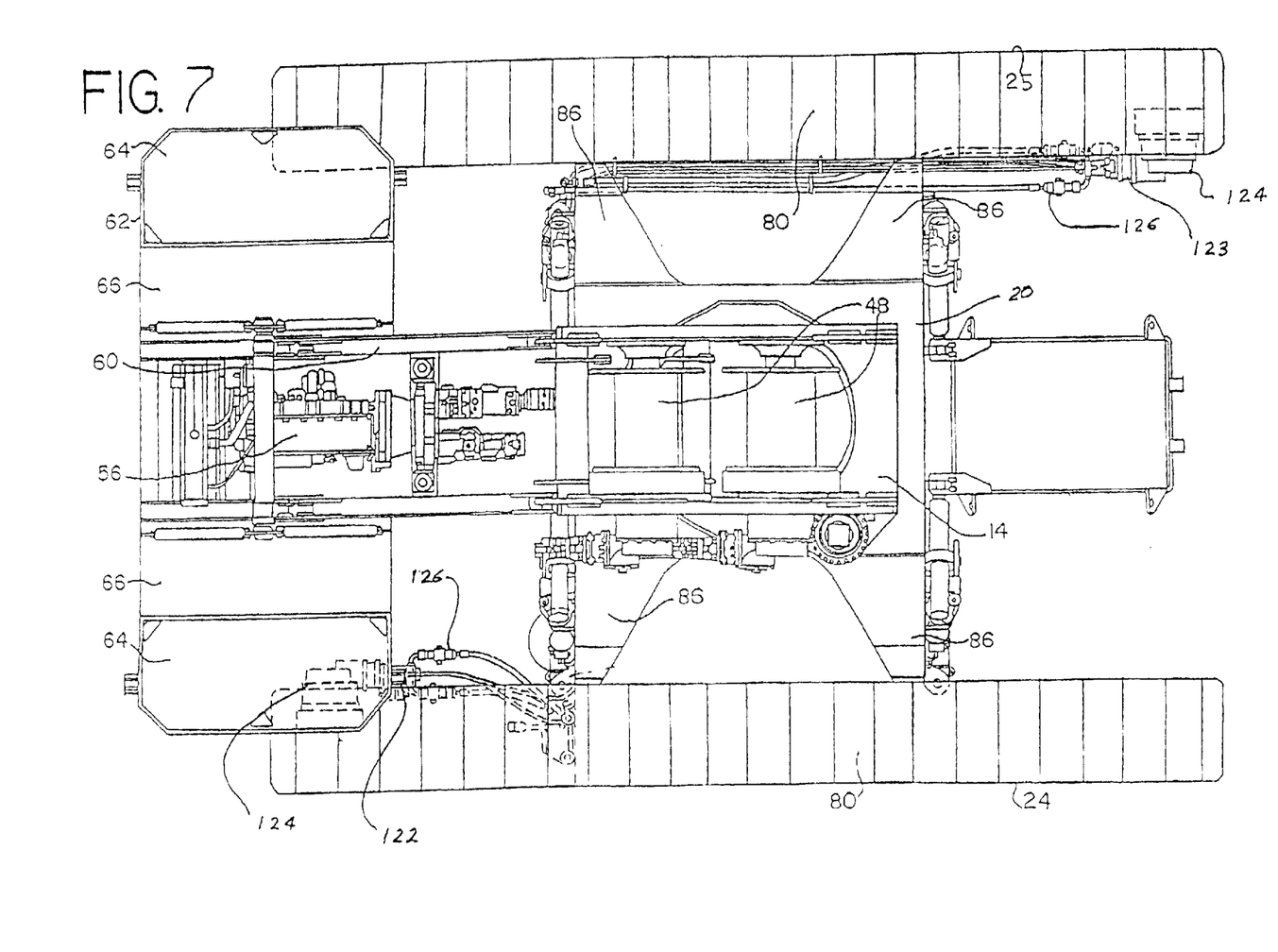
FIG. 7 is a sectional plan similar to FIG. 3 showing details of an alternative embodiment of the identical left and right crawler assemblies made in accordance with the teachings of this invention.

An alternative embodiment of the invention is shown in FIG. 7. In this embodiment, each crawler 24, 25 is independently powered by a hydraulic drive motor 122, 123 mounted directly on crawler 24, 25, respectively. Similar to the crawler drive assemblies 90, 91 of the preferred embodiment, each hydraulic drive motor 122, 123 is mounted to the crawler 24, 25 in an identical configuration. Each hydraulic drive motor 122, 123 is located at an opposite end of the crane 10. In the embodiment shown, the left hydraulic drive motor 123 is located near the forward end of the crane 10 and the right hydraulic drive motor 122 is located near the rearward end of the crane 10. It should be appreciated that the orientation of the hydraulic drive motors 122, 123 with respect to the crawlers 24, 25 is identical. In other words, the mounting configuration for the left hydraulic drive motor 122 is the same as the mounting configuration for the right hydraulic drive motor 123. It should also be appreciated that the individual components that comprise the hydraulic drive motors 122, 123 are identical. Like the preferred embodiment, either crawler 24, 25 may be mounted on either side of the crane 10.

In the embodiment shown, the hydraulic drive motors 122, 123 are each connected to the crawlers 24, 25 through a track drive gear box assembly 124 of similar design and function as described above in connection with the preferred embodiment. In this embodiment, disassembly and removal of the crawlers 24, 25 from the crane 10 ordinarily requires disconnection of the hydraulic hoses 126 from each of the hydraulic drive motors 122, 123.

It should be appreciated that the apparatus and methods of the present invention are capable of being incorporated in the form of a variety of embodiments, only a few of which have been illustrated and described above. For example, each crawler assembly could comprise a plurality of hydraulic motors connected to a single track drive gear box by either a single mechanical drive shaft or by separate drive shafts. In addition, it is possible to power each crawler by more than one crawler drive assembly. It is also possible for a crane or vehicle to have more than two crawlers. For example, some types of larger cranes utilize four separate crawler assemblies. Finally, it should be appreciated that the present invention will find application in any type of crawler crane or crawler powered vehicle. For example, the interchangeable crawler assemblies of the present invention can be used on a crawler crane that utilizes a conventional wire rope boom hoist arrangement for controlling the angle of the boom. Likewise, the interchangeable crawler assemblies of the present invention can be used on types of crawler vehicles other than cranes.

Thus, while various embodiments of the present invention have been described herein, those with skill in this art will recognize changes, modifications, alterations and the like which still shall come within the spirit of the inventive concept, and such are intended to be included within the scope of the invention as expressed in the following claims.

What is claimed is:

1. A crawler vehicle comprising a car body and a plurality of identical crawler assemblies, each said crawler assembly comprising a crawler track supported on a crawler frame, said crawler track being powered by only one drive assembly connected to the crawler frame at a single location spaced away from a center of said crawler assembly, wherein the crawler frame for each crawler assembly comprises an identical track frame weldment, each track frame weldment having a first end and a second end, the first end having a configuration that is different from the second end so as to form a track frame weldment with an asymmetric construction between the first end and the second end.

2. The crawler vehicle according to claim 1, wherein the drive assembly for each crawler assembly comprises identical components.

3. The crawler vehicle according to claim 1, wherein the drive assembly for each crawler assembly comprises:
   a) a hydraulic drive motor mounted on said car body, said hydraulic drive motor being connected to a hydraulic pump by a plurality of hydraulic hoses;
   b) a track drive gear box mounted on said crawler frame and connected to said crawler track, said gear box comprising a right-angle gear set and a speed reduction gear set; and
   c) a mechanical drive shaft for transmitting power from said hydraulic drive motor to said crawler drive gear box.

4. The crawler vehicle according to claim 3, wherein said mechanical drive shaft comprises a first and a second end, said first end being connected to said hydraulic drive motor and said second end being connected to said right-angle gear set, and wherein both of said connections comprise a universal joint and at least one of said connections is removable to permit disassembly of said crawler assembly from said car body without disconnecting said hydraulic drive motor from said hydraulic pump.

5. The crawler vehicle according to claim 1, wherein the drive assembly for each crawler assembly comprises a hydraulic drive motor mounted on said crawler frame, said drive motor being connected to a hydraulic pump by a plurality of hydraulic hoses.

6. The crawler vehicle according to claim 5, wherein a track drive gear box is mounted between said hydraulic drive motor and said crawler frame.

7. The crawler vehicle according to claim 6, wherein said track drive gear box comprises a right-angle gear set and a speed reduction gear set.

8. The crawler vehicle according to claim 1, wherein said crawler vehicle comprises an upper works rotatably mounted on a lower works, said lower works comprising said car body and said plurality of identical crawler assemblies.

9. A crawler crane having an upper works rotatably mounted on a lower works, said lower works comprising a car body and a pair of interchangeable crawler assemblies, each said crawler assembly having a first end and a second end, the first end having a configuration that is different from the second end so as to form a crawler assembly with an asymmetric construction between the first end and the second end, said crawler assembly comprising a crawler track supported on a crawler frame, said crawler track being powered by a single drive assembly that is at least partially supported by an end portion of the crawler frame.

10. The crawler crane according to claim 9, wherein the drive assembly for each crawler assembly comprises identical components.

11. The crawler crane according to claim 9, wherein the crawler frame for each crawler assembly comprises an identical track frame weldment, each track frame weldment having a first end and a second end, the first end having a configuration that is different from the second end so as to form a track frame weldment with an asymmetric construction between the first end and the second end.

12. The crawler crane according to claim 9, wherein the drive assembly for each crawler assembly comprises:
   a) a hydraulic drive motor mounted on said car body, said hydraulic drive motor being connected to a hydraulic pump by a plurality of hydraulic hoses;
   b) a track drive gear box mounted on said crawler frame and connected to said crawler track, said gear box comprising a right-angle gear set and a speed reduction gear set; and
   c) a mechanical drive shaft for transmitting power from said hydraulic drive motor to said crawler drive gear box.

13. The crawler crane according to claim 12, wherein said mechanical drive shaft comprises a first and a second end, said first end being connected to said hydraulic drive motor and said second end being connected to said right-angle gear set, and wherein both of said connections comprise a universal joint and at least one of said connections is removable to permit disassembly of said crawler assembly from said car body without disconnecting said hydraulic drive motor from said hydraulic pump.

14. The crawler crane according to claim 9, wherein the drive assembly for each crawler assembly comprises a hydraulic drive motor mounted on said crawler frame, said drive motor being connected to a hydraulic pump by a plurality of hydraulic hoses.

15. The crawler crane according to claim 14, wherein a track drive gear box is mounted between said hydraulic drive motor and said crawler frame.

16. The crawler crane according to claim 15, wherein said track drive gear box comprises a right-angle gear set and a speed reduction gear set.

17. A crawler vehicle comprising a car body, a first crawler assembly and a second crawler assembly, said first crawler assembly being removably mounted to a first side of said car body, said second crawler assembly being removably mounted to a second side of said car body, said first crawler assembly and said second crawler assembly each comprising a crawler track supported on a crawler frame, said crawler frame having a first end and a second end, said crawler track being powered by a drive assembly comprising a hydraulic drive motor, said hydraulic drive motor being mechanically coupled to the crawler track near the first end of the crawler frame only, wherein said first crawler assembly is configured to be mountable on said second side of said car body and said second crawler assembly is configured to be mountable on said first side of said car body, and wherein the crawler frame for said first crawler assembly and said second crawler assembly each comprise an identical track frame weldment, each track frame weldment having a first end and a second end, the first end having a configuration that is different from the second end so as to form a track frame weldment with an asymmetric construction between the first end and the second end.

18. The crawler vehicle according to claim 17, wherein the drive assembly for said first crawler assembly and said second crawler assembly each comprise identical components.

19. The crawler vehicle according to claim 17, wherein the hydraulic drive motor is mounted on said car body and is connected to a hydraulic pump by a plurality of hydraulic hoses, a track drive gear box is mounted on the crawler frame and is connected to the crawler track, said gear box comprising a right-angle gear set and a speed reduction gear set, and a mechanical drive shaft is connected between the hydraulic drive motor and the gear box.

20. The crawler vehicle according to claim 19, wherein said mechanical drive shaft comprises a first and a second end, said first end being connected to said hydraulic drive motor and said second end being connected to said right-angle gear box, and wherein both of said connections comprise a universal joint and at least one of said connections is removable to permit disassembly of said first crawler assembly or said second crawler assembly from said car body without disconnecting said hydraulic drive motor from said hydraulic pump.

21. The crawler vehicle according to claim 18, wherein the hydraulic drive motor for each drive assembly is mounted on said crawler frame, said drive motor being connected to a hydraulic pump by a plurality of hydraulic hoses.

22. The crawler vehicle according to claim 21, wherein a track drive gear box is mounted between said hydraulic drive motor and said crawler frame.

23. The crawler vehicle according to claim 22, wherein said track drive gear box comprises a right-angle gear set and a speed reduction gear set.

24. The crawler vehicle according to claim 17, wherein said crawler vehicle comprises an upper works rotatably mounted on a lower works, said lower works comprising said car body, said first crawler assembly and said second crawler assembly.

25. A crawler crane having an upper works rotatably mounted on a lower works, a boom pivotally mounted on said upper works, a load hoist line for lifting loads, said lower works comprising two independently powered crawler assemblies each mounted on a car body, each said crawler assembly being of identical design and comprising a crawler track supported by a crawler frame, wherein the crawler frame for each crawler assembly comprises an identical track frame weldment, each track frame weldment having a first end and a second end, the first end having a configuration that is different from the second end so as to form a track frame weldment with an asymmetric construction between the first end and the second end, and wherein each said crawler track is powered by a unitary drive assembly comprising:

a) a single hydraulic drive motor mounted on said car body, said drive motor being connected to a hydraulic pump by a plurality of hydraulic hoses;

b) a track drive gear box mounted on only one end of said crawler frame and connected to said crawler track, said gear box comprising a right-angle gear set and a speed reduction gear set; and c) a mechanical drive shaft for transmitting power from said hydraulic drive motor to said crawler drive gear box, said drive shaft comprising a first and a second end, said first end being connected to said drive motor, said second end being connected to said right-angle gear set, wherein both of said connections comprise a universal joint and at least one of said connections is removable to permit disassembly of said crawler assembly from said car body without disconnecting said hydraulic drive motor from said hydraulic pump.

26. The crawler crane according to claim 25, wherein the drive assembly for each crawler assembly comprises identical components.

* * * * *